(12) United States Patent
Kim et al.

(10) Patent No.: US 9,363,763 B2
(45) Date of Patent: Jun. 7, 2016

(54) USER EQUIPMENT THAT TRANSMITS AN UPLINK SIGNAL IN A MULTI-CARRIER SUPPORTING MOBILE COMMUNICATION SYSTEM AND A METHOD THEREFOR

(75) Inventors: Dong Cheol Kim, Anyang-si (KR); Han Gyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 596 days.

(21) Appl. No.: 13/522,300

(22) PCT Filed: Jan. 12, 2011

(86) PCT No.: PCT/KR2011/000221
§ 371 (c)(1),
(2), (4) Date: Jul. 13, 2012

(87) PCT Pub. No.: WO2011/087276
PCT Pub. Date: Jul. 21, 2011

(65) Prior Publication Data
US 2012/0300727 A1  Nov. 29, 2012

Related U.S. Application Data

(60) Provisional application No. 61/294,783, filed on Jan. 13, 2010.

(51) Int. Cl.
*H04W 4/00* (2009.01)
*H04W 52/14* (2009.01)
(Continued)

(52) U.S. Cl.
CPC .......... *H04W 52/146* (2013.01); *H04W 52/247* (2013.01); *H04W 52/248* (2013.01); *H04W 52/34* (2013.01); *H04W 52/325* (2013.01); *H04W 52/58* (2013.01)

(58) Field of Classification Search
USPC .......................................... 370/329; 455/522
See application file for complete search history.

(56) References Cited

U.S. PATENT DOCUMENTS

2006/0217119 A1 *  9/2006  Bosch et al. ............... 455/435.2
2008/0280638 A1   11/2008  Malladi et al.
(Continued)

FOREIGN PATENT DOCUMENTS

KR   10-2009-0113320   10/2009
WO   2009/113934       9/2009

OTHER PUBLICATIONS

Qualcomm Europe, "UL Power Control for Multicarrier Operation," 3GPP TSG RAN WG1 #58bis, R1-094209, Oct. 2009, 4 pages.
Samsung, "UL Transmission Power Control in LTE-A," 3GPP TSG RAN WG1 #58bis, R1-094086, Oct. 2009, 6 pages.
(Continued)

*Primary Examiner* — Steven H Nguyen
(74) *Attorney, Agent, or Firm* — Lee, Hong, Degerman, Kang & Walmey; Jonathan Kang; Michael Monaco

(57) ABSTRACT

The present invention provides user equipment that transmits an uplink signal in a multi-carrier supporting mobile communication system and a method therefor, and a base station device that transmits uplink transmission power information and a method therefor. In the user equipment according to the present invention, a receiving antenna receives uplink transmission power information on a particular uplink carrier from the base station via a plurality of downlink carriers. A processor determines the transmission power of a signal to be transmitted via the particular uplink carrier, based on the uplink transmission power information that has been received. A receiving antenna then transmits the signal via an uplink carrier at the transmission power determined by the processor.

8 Claims, 6 Drawing Sheets

(51) Int. Cl.
*H04W 52/24* (2009.01)
*H04W 52/34* (2009.01)
*H04W 52/58* (2009.01)
*H04W 52/32* (2009.01)

(56) References Cited

U.S. PATENT DOCUMENTS

| | | |
|---|---|---|
| 2009/0036081 A1* | 2/2009 | Catreux et al. ............ 455/277.1 |
| 2010/0323744 A1* | 12/2010 | Kim et al. .................... 455/522 |
| 2011/0081939 A1* | 4/2011 | Damnjanovic et al. ...... 455/522 |
| 2011/0081940 A1* | 4/2011 | Gerstenberger et al. ..... 455/522 |
| 2012/0208583 A1* | 8/2012 | Chung et al. ................. 455/509 |

OTHER PUBLICATIONS

European Patent Office Application Serial No. 11733063.9, Search Report dated Apr. 15, 2015, 8 pages.
Ericsson, et al., "Uplink Power Control for Carrier Aggregation," 3GPP TSG RAN WG1 Meeting #58bis, R1-094274, Oct. 2009, 4 pages.
3rd Generation Partnership Project (3GPP), "Technical Specification Group Radio Access Network; Evolved Universal Terrestrial Radio Access (E-UTRA); Multiplexing and channel coding (Release 8)," 3GPP TS 36.212 V8.7.0, May 2009, 60 pages.
European Patent Office Application Serial No. 11733063.9, Office Action dated Nov. 9, 2015, 7 pages.

* cited by examiner

FIG. 4
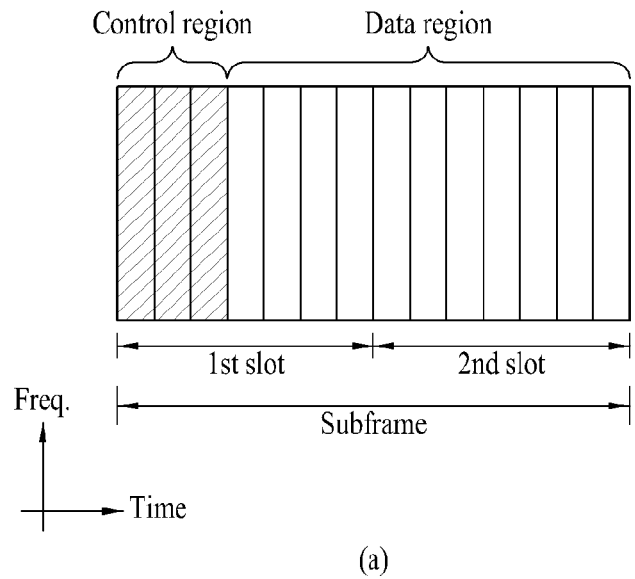
(a)
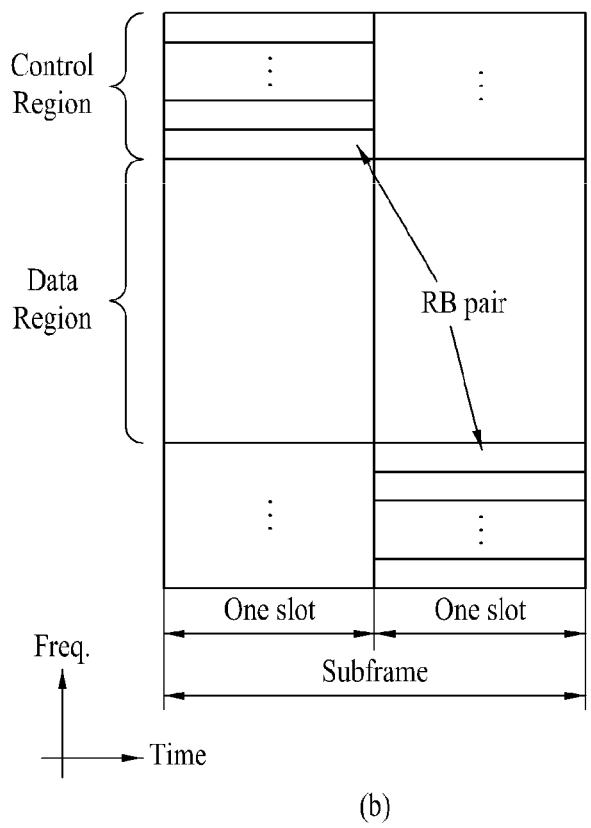
(b)

USER EQUIPMENT THAT TRANSMITS AN UPLINK SIGNAL IN A MULTI-CARRIER SUPPORTING MOBILE COMMUNICATION SYSTEM AND A METHOD THEREFOR

CROSS-REFERENCE TO RELATED APPLICATIONS

This application is the National Stage filing under 35 U.S.C. 371 of International Application No. PCT/KR2011/000221, filed on Jan. 12, 2011, which claims the benefit of U.S. Provisional Application Ser. No. 61/294,783, filed on Jan. 13, 2010, the contents of which are all incorporated by reference herein in their entirety.

TECHNICAL FIELD

The present invention relates to wireless communication and more particularly to a user equipment and method for transmitting an uplink signal and an eNode B and method for transmitting uplink transmission power information in a mobile communication system that supports multiple carriers.

BACKGROUND ART

3rd Generation Partnership Project Long Term Evolution (3GPP LTE) and LTE-Advanced (LTE-A) communication systems are briefly described below as exemplary mobile communication systems to which the present invention can be applied.

FIG. 1 schematically illustrates a network structure of an Evolved-Universal Mobile Telecommunications System (E-UMTS) as an exemplary mobile communication system. The E-UMTS is an evolved form of a conventional UMTS and standardization thereof is ongoing in the 3GPP. The E-UMTS may be considered a Long Term Evolution (LTE) system. For detailed contents of the technical specifications of the UMTS and the E-UMTS, reference may be made to Release 7 and Release 8 of "$3^{rd}$ Generation Partnership Project; Technical Specification Group Radio Access Network", respectively.

As shown in FIG. 1, the E-UMTS may include a User Equipment (UE), a base station (hereinafter, referred to as an "eNode B" or "eNB"), and an Access Gateway (AG) positioned at the end of the network (E-UTRAN) and connected to an external network. Generally, the eNode B may simultaneously transmit multiple data streams for broadcast services, multicast services and/or unicast services.

One or more cells may exist in one eNode B. Each cell is set to provide one of bandwidths of 1.25, 2.5, 5, 10, 15, and 20 MHz and provides a downlink or uplink transmission service to a plurality of UEs. Different cells may be set to provide different bandwidths. The eNode B controls data transmission and reception of multiple UEs. The eNode B transmits downlink (DL) scheduling information for DL data to inform the UE of a time/frequency region in which the DL data will be transmitted to the UE, information regarding encoding, data size, Hybrid Automatic Repeat and reQuest (HARQ) related information, and the like. In response to uplink (UL) data, the eNode B transmits UL scheduling information to the UE to inform the UE of a time/frequency region which can be used by the UE, information regarding encoding, data size, HARQ related information, and the like. An interface may be provided between eNode Bs for transmission of user traffic or control traffic. A Core Network (CN) may include the AG and a network node for user registration of the UE. The AG manages the mobility of the UE in units of Tracking Areas (TAs), each including a plurality of cells.

Although radio access technology has been developed to LTE based on Wideband Code Division Multiple Access (WCDMA), the demands and expectations of users and providers continue to increase. In addition, since other radio access technologies continue to be developed, evolution to new technologies is required to secure high competitiveness in the future. Decrease in cost per bit, increase in service availability, flexible use of a frequency band, simple structure, open interface, suitable UE power consumption and the like are required.

Recently, standardization of a successor technology to LTE is underway in 3GPP. In this specification, this technology is referred to as "LTE-A". Main differences between the LTE system and the LTE-A system include system bandwidth and introduction of a relay.

The LTE-A system aims to support a wideband of up to 100 MHz. To accomplish this, the LTE-A system adopts carrier aggregation or bandwidth aggregation technology which uses a plurality of frequency blocks to achieve wideband.

Carrier aggregation (or carrier integration) uses a plurality of frequency blocks as a single large logical frequency band in order to use a wider frequency band. The bandwidth of each frequency block may be defined based on the bandwidth of a system block used in the LTE system. Each frequency block is transmitted using a component carrier.

Although the LTE-A system, which is a next-generation communication system, adopts the carrier aggregation technology, conventional technologies cannot support uplink power control operations of a UE in a multi-carrier system. However, no specific studies have been conducted in this regard.

DISCLOSURE

Technical Problem

An object of the present invention is to provide a method for transmitting an uplink signal in a mobile communication system that supports multiple carriers.

Another object of the present invention is to provide a user equipment for transmitting an uplink signal in a mobile communication system that supports multiple carriers.

Another object of the present invention is to provide a method for an eNode B to transmit uplink transmission power information in a mobile communication system that supports multiple carriers.

Another object of the present invention is to provide an eNode B for transmitting uplink transmission power information in a mobile communication system that supports multiple carriers.

Objects of the present invention are not limited to those described above and other objects will be clearly understood by a person having ordinary knowledge in the art from the following description.

Technical Solution

To achieve the above objects of the present invention, a method of transmitting an uplink signal at a user equipment in a mobile communication system that supports multiple carriers according to the present invention may include receiving information regarding an uplink transmission power of a specific uplink carrier from an eNode B through a plurality of downlink carriers, determining a transmission power of a signal, which is to be transmitted in the specific uplink carrier, based on the received uplink transmission power information, and transmitting a signal through the uplink carrier using the determined transmission power.

The transmission power information of the specific uplink carrier may be received from each of the plurality of downlink carriers and the uplink transmission power information may be transmission power information of an uplink control channel.

The uplink transmission power information may be received through each of a plurality of downlink control channels allocated respectively to the plurality of downlink carriers. The uplink transmission power information received through each of the plurality of downlink carriers may include an uplink Transmit Power Control (TPC) command of the user equipment.

The TPC commands received through each of the plurality of downlink carriers may indicate the same value and the uplink transmission power may be determined based on the indicated value.

The TPC commands received through each of the plurality of downlink carriers may indicate two or more values and the uplink transmission power may be determined based on a value that is indicated a relatively large number of times among the two or more indicated values.

The TPC commands received through each of the plurality of downlink carriers may indicate two or more values and the uplink transmission power may be determined based on one of a maximum, minimum, and average of the indicated values.

To achieve the above objects of the present invention, a user equipment for transmitting an uplink signal in a mobile communication system that supports multiple carriers may include a reception antenna for receiving information regarding an uplink transmission power of a specific uplink carrier from an eNode B through a plurality of downlink carriers, a processor for determining a transmission power of a signal, which is to be transmitted in the specific uplink carrier, based on the received uplink transmission power information, and a transmission antenna for transmitting a signal through the uplink carrier using the determined transmission power.

The reception antenna may receive the transmission power information of the specific uplink carrier from each of the plurality of downlink carriers. The uplink transmission power information may be transmission power information of an uplink control channel.

The reception antenna may receive the uplink transmission power information through each of a plurality of downlink control channels allocated respectively to the plurality of downlink carriers.

The uplink transmission power information that the reception antenna has received through each of the plurality of downlink carriers may include an uplink Transmit Power Control (TPC) command.

The TPC commands that the reception antenna has received through the plurality of downlink carriers may indicate the same value and the processor may determine the uplink transmission power based on the indicated value.

The TPC commands that the reception antenna has received through each of the plurality of downlink carriers may indicate two or more values and the processor may determine the uplink transmission power based on a value that is indicated a relatively large number of times among the two or more indicated values.

The TPC commands that the reception antenna has received through each of the plurality of downlink carriers may indicate two or more values and the processor may determine the uplink transmission power based on one of a maximum, minimum, and average of the indicated values.

To achieve the above objects of the present invention, a method of transmitting an uplink transmission power information at an eNode B in a mobile communication system that supports multiple carriers may include configuring a Transmit Power Control (TPC) command regarding uplink transmission power of a specific uplink carrier for each of a plurality of downlink carriers, and transmitting the configured TPC command to a user equipment through each of the plurality of downlink carriers.

Values indicated by TPC commands set respectively for the plurality of downlink carriers may be the same value. Optionally, values indicated by TPC commands set respectively for the plurality of downlink carriers may include different values.

The TPC command regarding the uplink transmission power is a command for uplink control channel transmission of the user equipment.

To achieve the above objects of the present invention, an eNode B for transmitting uplink transmission power information in a mobile communication system that supports multiple carriers may include a processor for setting a Transmit Power Control (TPC) command regarding uplink transmission power of a specific uplink carrier for each of a plurality of downlink carriers, and a transmission antenna for transmitting the set TPC command to a user equipment through each of the plurality of downlink carriers.

Advantageous Effects

According to the present invention, it is possible to efficiently support an uplink power control operation of a UE in a system that supports multiple carriers.

Advantages of the present invention are not limited to those described above and other advantages will be clearly understood by a person having ordinary knowledge in the art from the following description.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

FIG. 4 illustrates structures of downlink and uplink subframes of a 3GPP LTE system which is an exemplary mobile communication system.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the mobile communication system is a 3GPP LTE or LTE-A system, the following descriptions, except descriptions specific to 3GPP LTE or LTE-A, may be applied to any other mobile communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "User Equipment (UE)" is used to generally describe any mobile or stationary user device such as a Mobile Station (MS), an Advanced Mobile Station (AMS), or a mobile terminal. In addition, the term "eNode B (eNB)" is used to generally describe any network node that communicates with the UE such as a Node B, a base station, or an Access Point (AP). Although this specification has been described based on the 3GPP LTE, LTE-A system, details of the present invention may be applied to various other communication systems.

In a mobile communication system, a UE can receive information from an eNode B through downlink and can transmit information to an eNode B through uplink. Information transmitted or received by the UE includes data and various control information and various physical channels are present according to the type or usage of information transmitted or received by the UE.

Figure 1:
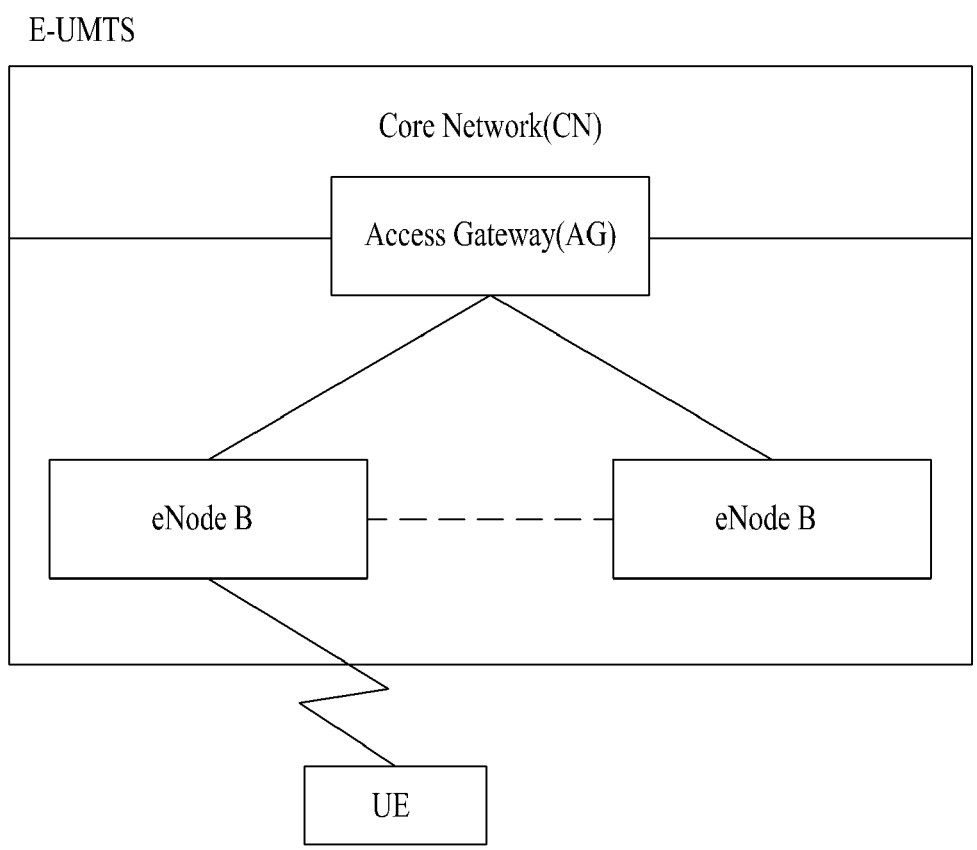
FIG. 1 schematically illustrates a network structure of an Evolved-Universal Mobile Telecommunications System (E-UMTS) as an exemplary mobile communication system.
Figure 2:
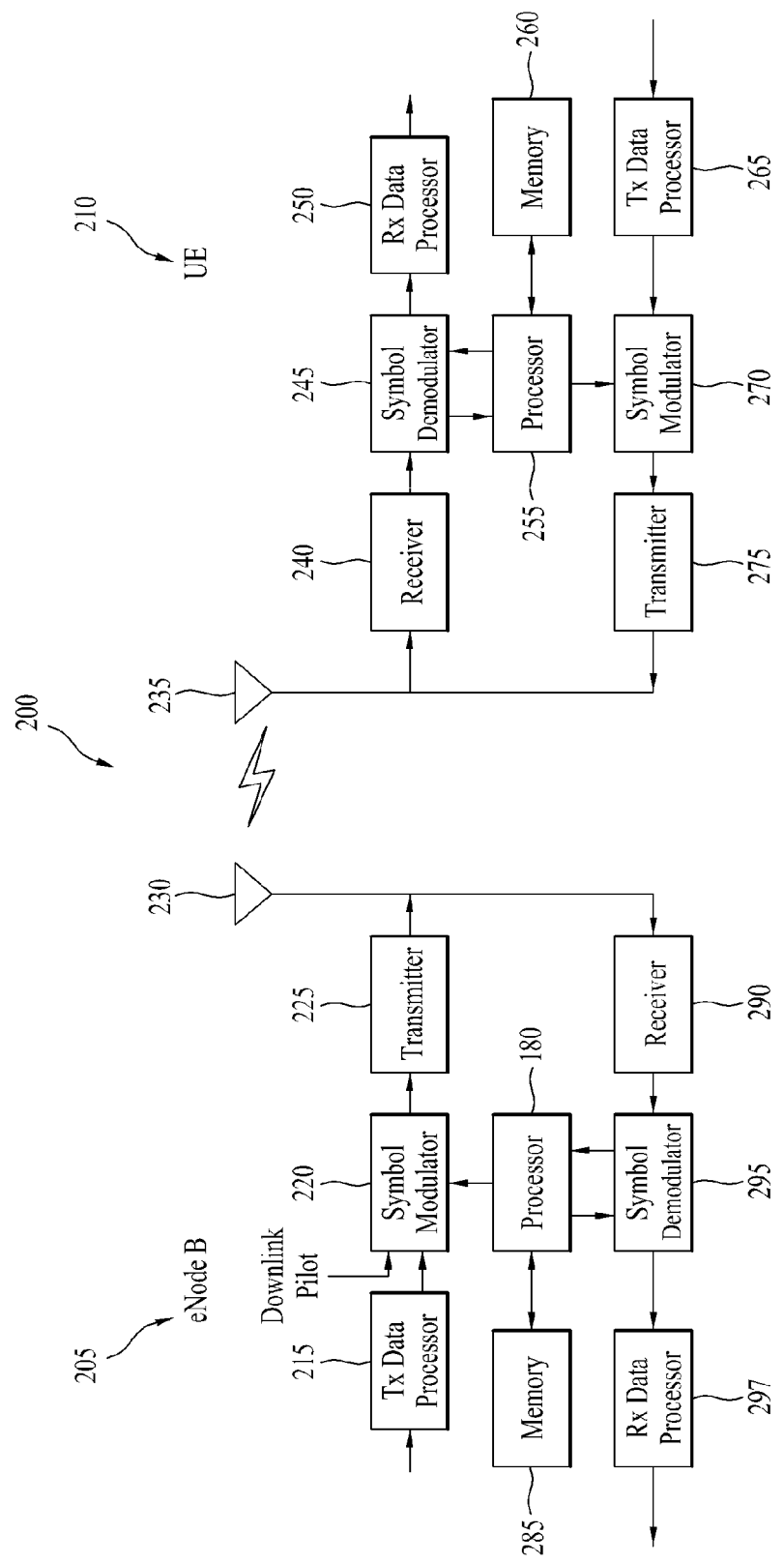
FIG. 2 is a block diagram illustrating a configuration of an eNode B 205 and a UE 210 in a wireless communication system 200.

FIG. 2 is a block diagram illustrating a configuration of an eNode B 205 and a UE 210 in a wireless communication system 200.

Although one eNode B 205 and one UE 210 are illustrated for simplified illustration of the wireless communication system 200, the wireless communication system 200 may include one or more eNode Bs and/or one or more UEs.

As shown in FIG. 2, the eNode B 205 may include a transmission (Tx) data processor 215, a symbol modulator 220, a transmitter 225, a transmission/reception antenna 230, a processor 280, a memory 285, a receiver 290, a symbol demodulator 295, and a received data processor 297. The UE 210 may include a transmission (Tx) data processor 265, a symbol modulator 270, a transmitter 275, a transmission/reception antenna 235, a processor 255, a memory 260, a receiver 240, a symbol demodulator 255, and a received data processor 250. Although FIG. 2 shows that the eNode B 205 and the UE 210 include one antenna 230 and one antenna 235, respectively, each of the eNode B 205 and the UE 210 may include a plurality of antennas. Thus, the eNode B 205 and the UE 210 support a Multiple Input Multiple Output (MIMO) system. The eNode B 205 according to the present invention may also support both Single User-MIMO (SU-MIMO) and Multi-User-MIMO (MU-MIMO).

In downlink, the transmission data processor 215 receives traffic data, formats the received traffic data, codes the formatted traffic data, interleaves and modulates (or symbol-maps) the coded traffic data, and provides modulated symbols (data symbols). The symbol modulator 220 receives and processes the data symbols and pilot symbols and provides a symbol stream.

The symbol modulator 220 multiplexes data and pilot symbols and transmits the multiplexed signal to the transmitter 225. Each transmission symbol may be a data symbol, a pilot symbol, or a signal value of 0. Pilot symbols may be consecutively transmitted at intervals of a symbol period. The pilot symbols may be Frequency Division Multiplexing (FDM), Orthogonal Frequency Division Multiplexing (OFDM), Time Division Multiplexing (TDM), or Code Division Multiplexing (CDM) symbols.

The transmitter 225 may receive a stream of symbols, convert the received symbol stream into one or more analog signals, and additionally regulate (for example, amplify, filter, and frequency-up-convert) the analog signals to generate a downlink signal suitable for transmission through a radio channel. Then, the antenna 230 transmits the generated downlink signal to the UE.

The antenna 235 in the UE 210 receives the downlink signal from the eNode B and provides the received signal to the receiver 240. The receiver 240 regulates (for example, filters, amplifies, and frequency-down-converts) the received signal and digitizes the regulated signal to acquire samples. The symbol demodulator 245 demodulates the received pilot symbols and provides the demodulated symbols to the processor 255 for channel estimation.

The symbol demodulator 245 receives an estimation of a frequency response to downlink from the processor 255 and performs data demodulation on the received data symbols to acquire data symbol estimations (including estimations of transmitted data symbols) and provides the data symbol estimations to the reception (Rx) data processor 250. The reception data processor 250 demodulates (i.e., symbol-demaps) the data symbol estimations and deinterleaves and decodes the same to restore transmitted traffic data.

Processes performed by the symbol demodulator 245 and the received data processor 250 are complementary to processes performed by the symbol modulator 220 and the transmission data processor 215 of the eNode B 205, respectively.

In uplink, the transmission data processor 265 of the UE 210 processes traffic data and provides data symbols. The symbol modulator 270 receives the data symbols and multiplexes and modulates the received data symbols to provide a stream of symbols to the transmitter 275. The transmitter 275 receives and processes the symbol stream to generate an uplink signal. The antenna 235 transmits the generated uplink signal to the eNode B 205.

The eNode B 205 receives the uplink signal from the UE 210 through the antenna 230 and the receiver 290 processes the received uplink signal to acquire samples. Then, the symbol demodulator 295 processes the samples to provide estimations of data symbols and pilot symbols received in uplink. The received data processor 297 processes the data symbol estimations to restore traffic data transmitted from the UE 210.

The respective processors 255 and 280 of the UE 210 and the eNode B 205 instruct the UE 210 and the 205 to perform required operations (for example, control, regulation, and management operations). The processors 255 and 280 may be connected to memory units 260 and 285 that store program code and data. The memories 260 and 285 are connected to the processors 255 and 280 to store operating systems, applications, and general files.

Each of the processors 255 and 280 may be referred to as a controller, a microcontroller, a microprocessor, or a microcomputer. The processors 255 and 280 may be implemented by hardware, firmware, software, or any combination thereof. In the case in which the embodiments of the present invention are implemented by hardware, application specific integrated circuits (ASICs), digital signal processors (DSPs), digital signal processing devices (DSPDs), programmable logic devices (PLDs), field programmable gate arrays (FPGAs), or the like may be provided in the processors 255 and 280.

In the case in which the embodiments of the present invention are implemented by firmware or software, the firmware or software may be configured so as to include modules, processes, functions, or the like which perform the functions or operations of the present invention. The firmware or software configured so as to implement the present invention may be provided in the processors 255 and 280 or may be stored in the memories 260 and 285 and may then be run by the processors 255 and 280.

The layers of the radio interface protocol between the UE and the eNode B and the wireless communication system (network) can be classified into a first layer L1, a second layer L2 and a third layer L3 based on the three lower layers of the Open System Interconnection (OSI) reference model widely known in the field of communication. A physical layer belonging to the first layer L1 provides an information transfer service using a physical channel. A Radio Resource Control (RRC) layer located at the third layer provides radio resources for control between the UE and the network. The UE and the eNode B may exchange RRC messages with the wireless communication network through the RRC layer.

Figure 3:
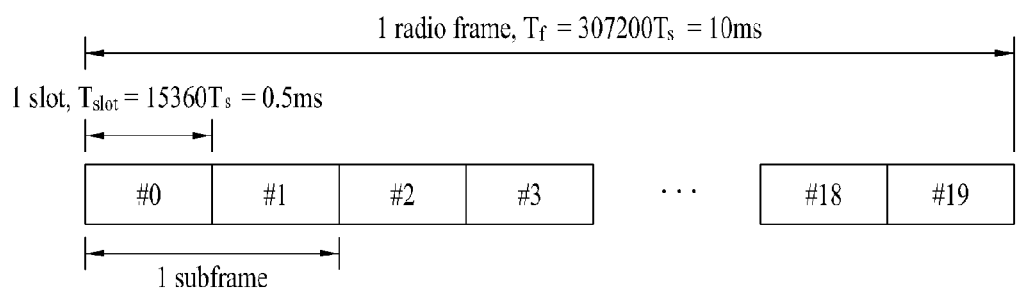
FIG. 3 illustrates a structure of a radio frame used in a 3GPP LTE system which is an exemplary mobile communication system.

FIG. 3 illustrates a structure of a radio frame used in a 3GPP LTE system which is an exemplary mobile communication system.

As shown in FIG. 3, one radio frame has a length of 10 ms (327200Ts) and 10 subframes of a uniform size. Each subframe has a length of 1 ms and 2 slots. Each slot has a length of 0.5 ms (15360Ts). Here, Ts denotes a sampling time which is calculated as $Ts=1/(15 \text{ kHz} \times 2048)=3.2552 \times 10^{-8}$ (about 33 ns). A slot includes a plurality of OFDM symbols or Single Carrier-Frequency Division Multiple Access (SC-FDMA) symbols in the time domain and includes a plurality of resource blocks in the frequency domain.

In the LTE system, one Resource Block (RB) includes 12 subcarriers×7 (or 6) OFDM or SC-FDMA symbols. A Transmission Time Interval (TTI), which is a unit time in which data is transmitted, may be determined to be one or more subframes. The structure of the radio frame described above is merely exemplary and the number of subframes included in a radio frame, the number of slots included in a subframe, or the number of OFDM symbols or SC-FDMA symbols included in a slot may be changed in various ways.

FIG. 4 illustrates structures of downlink and uplink subframes of a 3GPP LTE system which is an exemplary mobile communication system.

As shown in FIG. 4(a), one downlink subframe includes 2 slots in the time domain. Up to 3 front OFDM symbols of the first slot in the downlink subframe correspond to a control region to which control channels are allocated and the remaining OFDM symbols correspond to a data region to which a Physical Downlink Shared Channel (PDSCH) is allocated.

Downlink component carriers used in the 3GPP LTE system include a Physical Control Format Indicator Channel (PCFICH), a Physical Downlink Control Channel (PDCCH), and a Physical Hybrid-ARQ Indicator Channel (PHICH). The PCFICH that is transmitted in the first OFDM symbol of the subframe carries information regarding the number of OFDM symbols (i.e., the size of the control region) used to transmit component carriers in the subframe. Control information transmitted through a PDCCH is referred to as Downlink Control Information (DCI). The DCI indicates uplink resource allocation information, downlink resource allocation information, an uplink transmit power control command for arbitrary UE groups, or the like. The PHICH carries an acknowledgement/negative-acknowledgement (ACK/NACK) signal for an uplink Hybrid Automatic Repeat Request (HARQ). That is, an ACK/NACK signal for uplink data transmitted by a UE is transmitted through the PHICH.

The following is a description of a PDCCH which is a downlink physical channel.

Through the PDCCH, the eNode B may transmit information regarding resource allocation of a PDSCH, a transmission format (which may also be referred to as a DL grant), Transmit Power Control (TPC) of an arbitrary UE and individual UEs included in a group, a command set, activation of Voice over Internet Protocol (VoIP), and the like. The eNode B may transmit a plurality of PDCCHs in a control region and the UE may monitor the plurality of PDCCHs. The PDCCH includes an aggregation of one or more consecutive Control Channel Elements (CCEs). The eNode B may transmit a PDCCH including an aggregation of one or more consecutive CCEs through the control region via subblock interleaving. The CCE is a logical allocation unit used to provide a PDCCH with a coding rate which accords to the conditions of a radio channel. A CCE corresponds to a plurality of resource element groups. The format of the PDCCH and the possible number of bits of the PDCCH are determined according to the association between the number of CCEs and the coding rate provided by the CCEs.

Control information transmitted through the PDCCH is referred to as Downlink Control Information (DCI). The following Table 1 shows DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword nd random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates uplink resource allocation information, DCI formats 1 to 2 indicate downlink allocation information, and DCI formats 3 and 3A indicate an uplink Transmit Power Control (TPC) command for arbitrary UE groups.

DCI format 3/3A includes TPC commands for a plurality of UEs. The eNode B masks a CRC with a TPC-ID in the case of DCI format 3/3A. The TPC-ID is an identifier that the UE demasks in order to monitor a PDCCH carrying a TPC command. The TPC-ID may also be considered an identifier that the UE uses to decode the PDCCH in order to check whether or not a TPC command is transmitted through the PDCCH. Conventional identifiers such as a Cell Radio Network Temporary Identifier (C-RNTI), a PI-RNTI, an SC-RNTI, or an RA-RNTI may be reused to define the TPC-ID or a new identifier may be defined as the TPC-ID. Since the TPC-ID is an identifier for UEs of a specific set, the TPC-ID is different from the C-RNTI which is an identifier for a specific UE and is also different from the PI-RNTI, the SC-RNTI, and the RA-RNTI which are identifiers for all UEs in a cell. That is, when the DCI includes a TPC command for N UEs, the TPC command only needs to be received by the N UEs. When the DCI includes TPC commands for all UEs in a cell, the TPC-ID serves as an identifier for all UEs in the cell.

The UE searches for a TPC-ID by monitoring a set of candidate PDCCHs in a search space in a subframe. Here, the UE may search for the TPC-ID in a command search space or in a UE-specific search space. The common search space is a search space in which all UEs in the cell search for the TPC-ID and the UE-specific search space is a search space in which a specific UE searches for the TPC-ID. If no CRC error is detected when the TPC-ID has been demasked in a corresponding candidate PDCCH, the UE can receive a TPC command in the PDCCH.

A TPC-ID which is an identifier for a PDCCH that carries only a plurality of TPC commands is also defined. When the TPC-ID is detected, the UE receives each TPC command in the corresponding PDCCH. The TPC command is used to control transmit power of an uplink channel. Accordingly, it is possible to prevent failure of transmission to the eNode B or to prevent interference caused to other UEs.

How an eNode B maps resources for PDCCH transmission in an LTE system or the like is briefly described below.

Generally, the eNode B may transmit scheduling allocation information and other control information through a PDCCH. A physical control channel may be transmitted through one aggregation or a plurality of consecutive Control Channel Elements (CCEs). One CCE includes 9 Resource Element Groups (REGs). The number of RBGs which have not been allocated to a Physical Control Format Indicator Channel (PCFICH) or a Physical Hybrid Automatic Repeat Request Indicator Channel (PHICH) is $N_{REG}$. CCEs which are available in the system are CCEs 0 to $N_{CCE}-1$ (where $N_{CCE}=\lfloor N_{REG}/9 \rfloor$). The PDCCH supports multiple formats as shown in the following Table 2. One PDCCH which consists of n consecutive CCEs starts from a CCE for which "i mode n=0" is satisfied (where i is CCE number). Multiple PDCCHs may be transmitted through one subframe. Multiple PDCCHs may be transmitted through a subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The eNode B may determine a PDCCH format according to the number of regions through which control information or the like is to be transmitted as shown in Table 2. The UE can reduce overhead by reading control information or the like in units of CCEs.

Referring to FIG. 4(b), an uplink subframe may be divided into a control region and a data region in the frequency domain. The control region is allocated to a Physical Uplink Control CHannel (PUCCH) which carries uplink control information. The data region is allocated to a Physical Uplink Shared CHannel (PUSCH) which carries user data. One UE does not simultaneously transmit the PUCCH and the PUSCH in order to maintain single carrier characteristics. A PUCCH for one UE is allocated to an RB pair in one subframe. RBs belonging to the RB pair occupy different subcarriers in 2 slots. The RB pair allocated to the PUCCH is frequency-hopped at a slot boundary.

Figure 5:
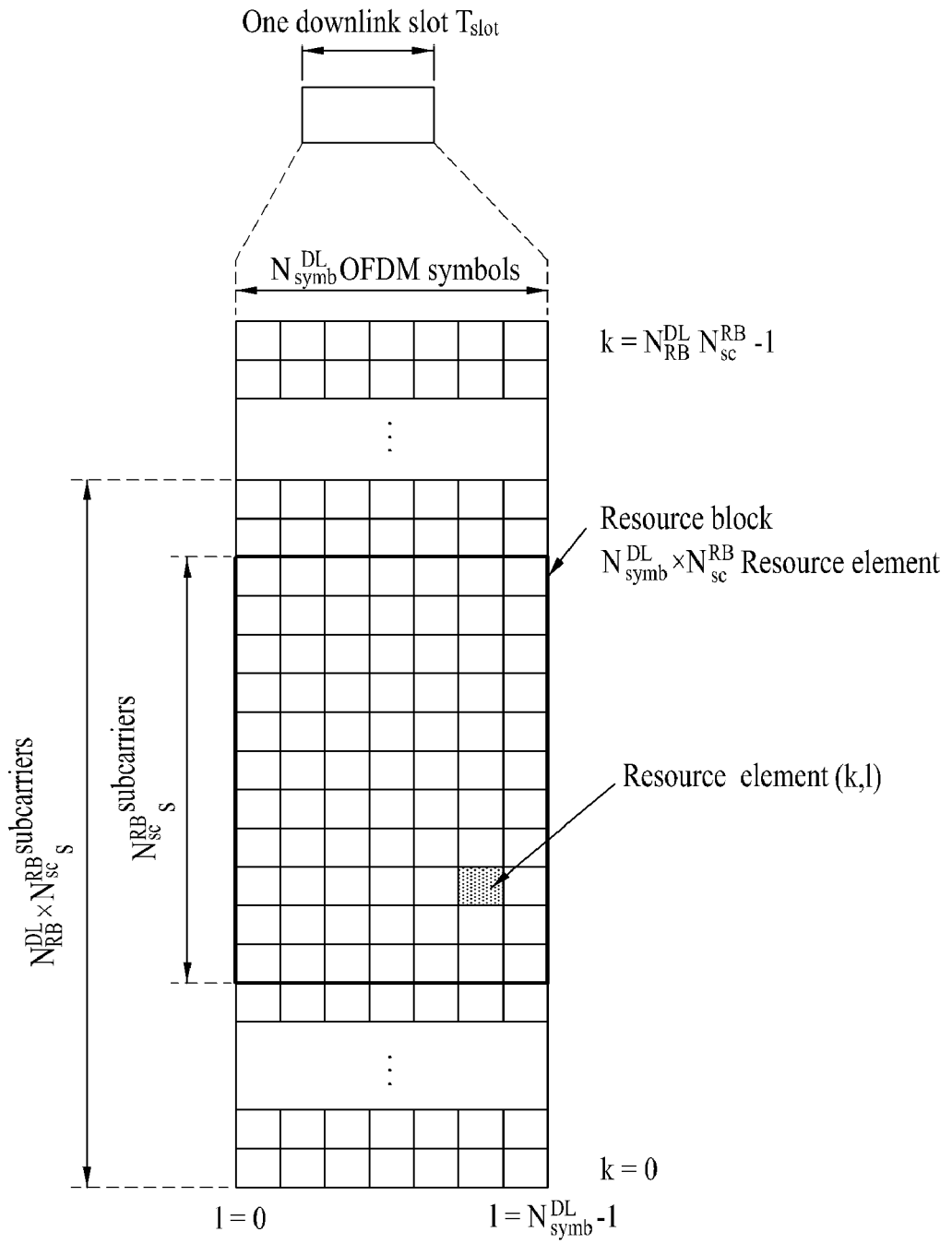
FIG. 5 illustrates a downlink time-frequency resource grid structure in a 3GPP LTE system.

FIG. 5 illustrates a downlink time-frequency resource grid structure in a 3GPP LTE system.

A downlink signal transmitted in each slot uses a resource grid structure including $N_{RB}^{DL} \times N_{SC}^{RB}$ subcarriers and $N_{symb}^{DL}$ OFDM symbols. Here, $N_{RB}^{DL}$ denotes the number of Resource Blocks (RBs) in downlink, $N_{SC}^{RB}$ denotes the number of subcarriers that constitute one RB, and $N_{symb}^{DL}$ denotes the number of OFDM symbols in one downlink slot. The magnitude of $N_{RB}^{DL}$ varies according to a downlink transmission bandwidth configured in a cell and should satisfy $N_{RB}^{min,DL} \leq N_{RB}^{DL} \leq N_{RB}^{max,DL}$. Here, $N_{RB}^{min,DL}$ is the smallest downlink bandwidth supported in the wireless communication system and $N_{RB}^{max,DL}$ is the largest downlink bandwidth supported in the wireless communication system. $N_{RB}^{min,DL}$ and $N_{RB}^{max,DL}$ may respectively be, but are not limited to, 6 and 110 (i.e., $N_{RB}^{min,DL}=6$ and $N_{RB}^{max,DL}=110$). The number of OFDM symbols included in one slot may vary according to the length of a cyclic Prefix (CP) and the interval between each subcarrier. In the case of multiple antenna transmission, one resource grid may be defined per antenna port.

Each element in a resource grid for each antenna port is referred to as a Resource Element (RE) and is uniquely identified by a pair of indices (k, l) in a slot. Here, k is a frequency-domain index and l is a time-domain index and k has a value in the range of 0 to $N_{RB}^{DL} N_{SC}^{RB}-1$ and l has a value in the range of 0 to $N_{symb}^{DL}-1$.

An RB shown in FIG. 5 is used to describe the mapping relationship between a physical channel and REs. RBs may be divided into Physical Resource Blocks (PRBs) and Virtual Resource Blocks (VRBs). One PRB is defined as a combination of $N_{symb}^{DL}$ consecutive OFDM symbols in the time domain and $N_{SC}^{RB}$ consecutive subcarriers in the frequency domain. Here, $N_{symb}^{DL}$ and $N_{SC}^{RB}$ may be predetermined values. For example, $N_{symb}^{DL}$ and $N_{SC}^{RB}$ may be given as shown in the following table. Accordingly, one PRB consists of $N_{symb}^{DL} \times N_{SC}^{RB}$ REs. One PRB may correspond to, but is not limited to, one slot in the time domain and 180 kHz in the frequency domain.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

One PRB has a value in the range of 0 to $N_{RB}^{DL}-1$ in the frequency domain. The relationship between PRB number $n_{PRB}$ in the frequency domain and an RE (k, l) in one slot satisfy a condition of $$n_{PRB} = \left\lfloor \frac{k}{N_{sc}^{RB}} \right\rfloor.$$

The size of one VRB is equal to that of one PRB. The VRB may be classified into two types, a Localized VRB (LVRB) and a Distributed VRB (DVRB). For each type of the VRB, a single VRB number $n_{VRB}$ is allocated to a pair of VRBs present in two slots in one subframe.

As described above, the VRB and the PRB may have the same size and, for each of the two types of the VRB (the first type being a Localized VRB (LVRB) and the second a Distributed VRB (DVRB)), a pair of VRBs having a single VRB index (which may also be referred to as VRB number) is allocated to 2 slots of 1 subframe. That is, one of the indices 0 to $N_{RB}^{DL}-1$ is allocated to $N_{RB}^{DL}$ VRBs belonging to the first of two slots that constitute one subframe and one of the indices 0 to $N_{RB}^{DL}-1$ is also allocated to $N_{RB}^{DL}$ VRBs belonging to the second of the two slots.

The following is a description of a procedure for an eNode B to transmit a PDCCH to a UE in downlink in an LTE system.

The eNode B determines a PDCCH format according to Downlink Control Information (DCI) that the eNode B is to transmit to the UE in downlink and attaches a Cyclic Redundancy Check (CRC) to the control information. The CRC is masked with a unique identifier (which is referred to as a Radio Network Temporary Identifier (RNTI)) according to the owner or usage of the PDCCH. When the PDCCH is for a specific UE, the CRC may be masked with a unique identifier of the UE, for example, a Cell-RNTI (C-RNTI). When the PDCCH is for a paging message, the CRC may be masked with a paging indication identifier, for example, a Paging-RNTI (P-RNTI). When the PDCCH is for system information, the CRC may be masked with a system information identifier or a system information-RNTI (SI-RNTI). The CRC may be masked with a random access-RNTI (RA-RNTI) in order to indicate a random access response which is a response to transmission of a random access preamble. The following table 4 shows exemplary identifiers which are masked within a PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (it could be differentiated according to the type of system information). |
| | RA-RNTI | used for random access response (it could be differentiated according to subframe or PRACH slot index for UE PRACH transmission). |
| | TPC-RNTI | used for uplink transmit power control command (it could be differentiated according to the index of UE TPC group). |

When a C-RNTI is used, the PDCCH carriers control information for a specific UE corresponding to the C-RNTI and, when a different RNTI is used, the PDCCH carries command control information that is received by all or a plurality of UEs in a cell. The eNode B generates coded data by performing channel coding on DCI to which a CRC has been added. The eNode B then performs rate matching according to the number of CCEs allocated to the PDCCH format. Thereafter, the eNode B modulates the coded data to generate modulation symbols. The eNode B then maps the modulation symbols to a physical resource element.

3rd Generation Partnership Project (3GPP) designates a Long Term Evolution-Advanced (LTE-A) system as a next generation of the LTE system to satisfy the demand for future-oriented services. The LTE-A adopts system Carrier Aggregation (CA) (or carrier integration) technology and performs transmission by aggregating a plurality of Component Carriers (CCs) to increase the transmission bandwidth of the UE and increase the efficiency of use of frequencies. The LTE-A system can extend the bandwidth to up to 100 MHz by combining and using multiple carriers unlike the conventional LTE Rel 8/9 which uses a single carrier. That is, each carrier having a bandwidth of up to 20 MHz defined in the conventional LTE Rel 8/9 is redefined as a component carrier (or element carrier) to allow one UE to use up to 5 component carriers through carrier aggregation technology.

Current carrier aggregation technology has the following features.

(1) Carrier aggregation technology supports aggregation of contiguous component carriers and also supports aggregation of non-contiguous component carriers.

(2) Although the number of component carriers in a carrier aggregation in uplink and the number of component carriers in a carrier aggregation in downlink may be different, each carrier aggregation should be constructed of the same number of component carriers in uplink and downlink if there is a need to achieve backward compatibility with previous systems.

(3) Each carrier aggregation may include different numbers of component carriers in uplink and downlink to acquire different transmission bandwidths in uplink and downlink.

(4) Each component carrier independently transmits one transport block for the UE and an independent Hybrid Automatic Repeat reQuest (HARQ) mechanism is provided.

Unlike the conventional LTE system that uses a single carrier, the carrier aggregation technology which uses multiple component carriers (CCs) requires a method for efficiently managing CCs. To efficiently manage CCs, CCs may be classified according to the role or feature thereof. CCs may be divided into Primary Component Carriers (PCC) and Secondary Component Carriers (SCC). The PCC, which is defined for each UE, is a CC which plays a central role in CC management when multiple CCs are used. The PCC may also be referred to as a Primary cell (Pcell) or the like.

CCs other than the PCC are defined as SCCs. The SCCs may also be referred to as Secondary cells (Scells). The PCC may serve as a primary carrier for managing all aggregated CCs and the other SCCs may serve to provide additional frequency resources to provide higher transfer rate. For example, the eNode B may perform (RRC) connection for signaling with the UE through the PCC. Provision of information for higher layer or security may also be performed through the PCC. When only one CC is present, the CC serves as a PCC. In this case, the PCC may play the same role as a carrier in the conventional LTE system.

The eNode B may allocate, to a UE, an Activated Component Carrier (ACC) which has been activated for the UE from among a number of CCs. The UE already knows the ACC allocated to the UE through signaling or the like.

The following is a description of uplink transmission power and PUCCH formats defined in LTE Release-8. The PUCCH is an uplink control channel that carries uplink control information and cannot be transmitted simultaneously with a PUSCH in the LTE system due to single-carrier characteristics. However, as carrier aggregation is introduced in the LTE-A system, the PUCCH can be transmitted together with the PUSCH in a specific CC (for example, a PCC or Pcell) in the LTE-A system. LTE Release-8 supports a number of PUCCH formats which are shown in the following Table 8. PUCCH formats 2a and 2b support normal CP alone.

TABLE 5

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The following Expression 1 expresses uplink power for uplink control channel of a UE in LTE Release-8 in units of dBm.

$$P_{PUCCH}(i) = \min\{P_{CMAX}, P_{O\_PUCCH} + PL + h(n_{CQI}, n_{HARQ}) + \Delta_{F\_PUCCH}(F) + g(i)\}$$ Expression 1

Here, i denotes subframe index, $P_{CMAX}$ denotes the maximum transmittable power of the UE, $P_{O\_PUCCH}$ denotes a parameter including a combination of cell-specific parameters, and PL denotes a downlink path loss (or signal loss) estimation that the UE has calculated in units of dB as PL=reference Signal Power−higher layer filtered RSRP. h(n) denotes a value that varies according to the PUCCH format, $n_{CQI}$ denotes number information bits of Channel Quality Information (CQI), and $n_{HARQ}$ denotes the number of HARQ bits. $\Delta_{F\_PUCCH}(F)$ denotes a value corresponding to PUCCH format(F) as a value relative to that of PUCCH format 1a. g(i) denotes a current PUCCH power control adjustment state of a subframe of index i. $h(n_{CQI}, n_{HARQ})$ is 0 in PUCCH formats 1, 1a, and 1b and may be expressed as in the following Expression 2 in the case of normal Cyclic Prefix (CP) in PUCCH formats 2, 2a, and 2b.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases}$$ Expression 2

The following Table 6 shows $\delta_{PUCCH}$ values mapped to a TPC command field in DCI formats 1A/1B/1D/1/2A/2/3 and Table 7 shows $\delta_{PUCCH}$ values mapped to a TPC command field in DCI format 3A. Here, $\delta_{PUCCH}$ denotes a UE-specific correction value.

TABLE 6

| TPC Command Field in DCI format 1A/1B/1D/1/2A/2/3 | $\delta_{PUCCH}$ [dB] |
| --- | --- |
| 0 | −1 |
| 1 | 0 |
| 2 | 1 |
| 3 | 3 |

TABLE 7

| TPC Command Field in DCI format 3A | $\delta_{PUCCH}$ [dB] |
| --- | --- |
| 0 | −1 |
| 1 | 1 |

In a mobile communication system that supports multiple downlink/uplink carriers, a UE may use a plurality of downlink carriers and may transmit a feedback report of traffic of one or a plurality of downlink carriers to an eNode B using an uplink carrier. When the eNode B requests an ACK/NACK message for downlink traffic, the UE may transmit an ACK/NACK message using an uplink control channel through resources (in the time and frequency domains) that have been allocated to the UE in an uplink transmission interval. When the UE transmits a plurality of ACK/NACK messages through an uplink control channel, power setting is performed using a corresponding power control equation. Here, in the case of a system in which a UE performs uplink power control by receiving a TPC command from an eNode B, the eNode B also needs to multiplex and transmit TPC commands to the UE in order to support multiple downlink/uplink carriers.

In the LTE Rel-8 system, ACK/NACK feedback of the UE may be transmitted through 1 bit (for downlink transmission of one codeword) or 2 bits (for downlink transmission of two codewords).

When the ratio between the number of downlink carriers ($M_{DL}$) and the number of uplink carriers ($N_{UL}$) is 1:1, the eNode B and the UE may operate according to an extended version of the single carrier system. That is, it is possible to apply an extended version of the above Expression 1 in which parameter values shown in the above Expression 1 are applied in a carrier dependent manner. As an extension of Expression 1, the following Expression 3 expresses an uplink control channel power equation in a system that supports multiple carriers.

$$P_{PUCCH,c}(i) = \min\{P_{CMAX}, P_{O\_PUCCH,c} + PL_{-c} + h_{-c}(n_{CQI}, n_{HARQ}) + \Delta_{F\_PUCCH}(F_{-c}) + G_{-c}(i)\}\text{dBm}$$ Expression 3

Here, c denotes a carrier index.

Although power control parameter values may be applied differently for each carrier, it is also possible to use the same parameter values in a carrier aggregation (CA) or in a specific-purpose carrier group. The eNode B may transmit a TPC command required for transmission of each uplink carrier through DCI format 1A/1B/1D/1/2A/2 (together with a C-RNTI or an SPS C-RNTI of the UE) or DCI format 3/3A (together with a TPC-PUCCH-RNTI of the UE) which is transmitted through a PDCCH and the UE may decode and apply the same for uplink transmission.

When the number of downlink carriers is greater than the number of uplink carriers, the UE may transmit ACK/NACK messages for traffic of a plurality of downlink carriers simultaneously in a specific uplink carrier (for example, a primary uplink carrier) or separately in uplink carriers. In the case in which the UE transmits ACK/NACK messages for traffic of a plurality of downlink carriers using one uplink carrier, it is possible to consider a method in which the same number of ACK/NACK messages as the number of the received downlink traffic carriers are transmitted without changing the ACK/NACK message format of the conventional LTE Rel-8 system and a method in which the ACK/NACK messages are transmitted by changing the message format.

When the PUCCH format is changed, there is a need to redefine the values of $\Delta_{F\_PUCCH}(F)$ and $h(n_{CQI}, n_{HARQ})$ in the above Expression 1 since required power level is changed due to change of information bits. The value of $\Delta_{F\_PUCCH}(F)$ is represented as a value relative to that of the PUCCH format 1a.

In the case in which the UE transmits the same number of ACK/NACK messages as the number of downlink carriers in response to traffic received for each individual downlink carrier, there is a need to predefine a mapping relationship between the ACK/NACK messages and the corresponding downlink carriers. This mapping relationship may be shared by the eNode B and the UE in an implicit or explicit manner. Accordingly, the UE can transmit a corresponding ACK/NACK message for traffic received in each downlink carrier according to the known mapping relationship.

In addition, when the eNode B transmits a TPC command included in a DL grant message to the UE in each downlink carrier, the UE may transmit an ACK/NACK message for traffic of each received downlink carrier through one or a plurality of uplink carriers. Here, the UE may determine transmission power of an ACK/NACK message transmitted through one or a plurality of uplink carriers based on a TPC command received from each downlink carrier. However, when the number of uplink carriers is less than the number of downlink carriers, it is also possible to employ a method in which the eNode B transmits the same number of TPC commands as the number of uplink carriers.

Figure 6:
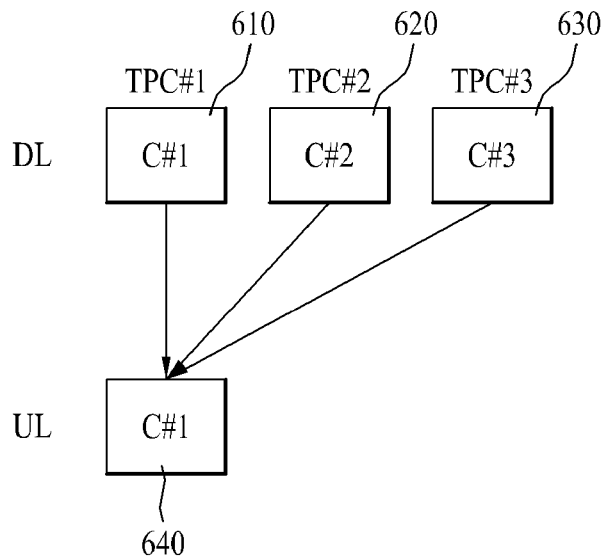
FIG. 6 illustrates an example in which a UE receives traffic from a plurality of downlink carriers and transmits an uplink signal through one uplink carrier.

FIG. 6 illustrates an example in which a UE receives traffic from a plurality of downlink carriers and transmits an uplink signal through one uplink carrier.

As shown in FIG. 6, the UE may receive downlink traffic through 3 downlink carriers 610, 620, and 630 and transmit an uplink signal through one uplink carrier 640. The mapping relationship between the downlink carriers and the uplink carriers is predefined and known by both the UE and the eNode B. As shown in FIG. 6, when the number of uplink carriers is 1, it is possible to consider the case in which an uplink control channel is transmitted in only one of a plurality of uplink carriers.

When the eNode B transmits a DL grant message to the UE through all downlink carriers 610, 620, and 630, the UE may receive 3 TPC commands for PUCCHs in DL grant messages of PDCCHs of the downlink carriers 610, 620, and 630. The TPC commands that the eNode B transmits through the PDCCHs of the downlink carriers 610, 620, and 630 may have the same or different values. For example, although TPC command values transmitted through the downlink carriers 610 and 620 may be equal, the TPC command values may differ from the TPC command value transmitted through the downlink carrier 630. In addition, all TPC command values transmitted through the downlink carriers 610, 620, and 630 may differ from each other.

The three TPC command values that the UE has received from the eNode B through the downlink carriers 610, 620, and 630 may be applied to uplink transmission power using various methods. When the three TPC command values received by the UE are the same, the UE may determine transmission power of an uplink control channel to be transmitted through the uplink carrier 640 based on the same TPC command value. However, when the three TPC command values received by the UE include equal TPC command values although all of the received three TPC command values are not equal, the UE may determine transmission power of the uplink control channel based on equal TPC command values, the number of which is the greatest among at least one set of equal TPC command values. In addition, when the three TPC command values received by the UE are all different from each other, the UE may determine transmission power of the uplink control channel based on one of the maximum, minimum, and average of the TPC command values.

In addition, the UE may determine transmission power using only a TPC command value of a specific downlink carrier from among the three received TPC commands or may determine transmission power using a method in which TPC command values are used in a predetermined order and, when the UE has failed to receive a PDCCH of a desired downlink carrier, the UE determines transmission power based on a TPC command value in a next DL grant message in the predetermined order.

Although it is assumed in the above description that the eNode B transmits a TPC command through a PDCCH through all downlink carriers 610, 620, and 630, the eNode B may also transmit the TPC command through only a specific downlink carrier (for example, the downlink carrier 610) linked with the uplink carrier 640. In this case, the eNode B may use regions for the TPC command in the downlink carriers 620 and 630 for different purposes to efficiently use resources. The eNode B may repeatedly transmit the TPC command in a DL grant message of each of the downlink carriers 610, 620, and 630 to cope with the case in which the UE fails to receive the PDCCH. That is, even when the UE has failed to receive a PDCCH of a specific downlink carrier, the UE may receive a TPC command of a different downlink carrier and control transmission power of an uplink control channel.

When the UE transmits a plurality of ACK/NACK messages for traffic of a plurality of downlink carriers through one uplink carrier, the UE may transmit the plurality of ACK/NACK messages in various manners. Here, the amount of information to be transmitted may be increased due to transmission of a plurality of ACK/NACK messages for traffic of a plurality of downlink carriers. The UE may determine transmission power of an uplink control channel by reflecting such change in the amount of information in the values of the parameters $\Delta_{F\_PUCCH}(F)$ and $h(n_{CQI}, n_{HARQ})$ which change according to PUCCH format in the above Expression 1.

Accordingly, the UE may determine power of various types of PUCCH formats by applying the parameter values that have changed based on Expression 1. The following Expression 4 shows individual PUCCH format power symbols for the plurality of uplink control channels.

$$P_{PUCCH\_format\_a}, P_{PUCCH\_format\_b},$$
$$P_{PUCCH\_format\_c}, \ldots \text{etc} \qquad \text{Expression 4}$$

Here, a, b, and c denote PUCCH indices.

The following Expression 5 shows an equation for obtaining power for each individual PUCCH format.

$$P_{0\_PUCCH} + PL + h(n_{CQI}, n_{HARQ}) + \Delta_{F\_PUCCH}(F) + g(i)$$
$$(\text{dBm}) \qquad \text{Expression 5}$$

Here, i denotes a subframe index.

The UE may calculate total PUCCH power as shown in the following Expression 6.

$$P_{PUCCH}(i) = \min\left\{P_{CMAX}, \sum_{n=1}^{N} P_{PUCCH\_format,n}\right\} \qquad \text{Expression 6}$$

Here, N denotes the total number of PUCCHs.

In Expression 6, $P_{CMAX}$ is the maximum transmittable power of the UE and a value preset in the system may be used as the value of $P_{CMAX}$. There is no operational problem when the sum of the respective powers of the PUCCH formats is less than $P_{CMAX}$. However, when the sum of powers of the PUCCH formats is greater than $P_{CMAX}$, it is possible to consider a method of reducing the respective powers of the PUCCH formats by the same ratio, a method of reducing the powers of the PUCCH formats by the same ratio as a weight ratio between the formats, or a method of allocating power in decreasing order of importance.

Although the value of $P_{CMAX}$ of the above Expression 6 may be used when power is first allocated to the PUCCH, the value of $P_{CMAX}$ may be expressed in the form of $P_{CMAX}$-$P_{abc}$ otherwise. Here, $P_{abc}$ denotes a power level of a resource region that is allocated prior to the PUCCH. In addition, an arbitrary maximum power other than the value of $P_{CMAX}$ may be set for special purposes. For example, an arbitrary maximum power may be set in a cell-specific, component carrier-specific, user equipment-specific, antenna-specific, or frequency partition-specific manner.

The above Expression 4 shows a power level per unit Resource Block (RB) when one RB is used. When the RB or the number of RBs may vary due to change in each individual PUCCH format, there is a need to add log 10(M) (where M is bandwidth) to Expression 4 taking into consideration the number of RBs.

As can be seen from the above Table 5, the UE needs to transmit PUCCH format 1a up to three times when the eNode B performs transmission using only codeword in the three downlink carriers 610, 620, and 630. If the PUCCH resource regions are insufficient, the UE may individually transmit each PUCCH format in an arbitrary transmission interval. In addition, when the messages to be transmitted are all ACK messages or NACK messages, the UE may transmit the PUCCH format 1a only once.

Figure 7:
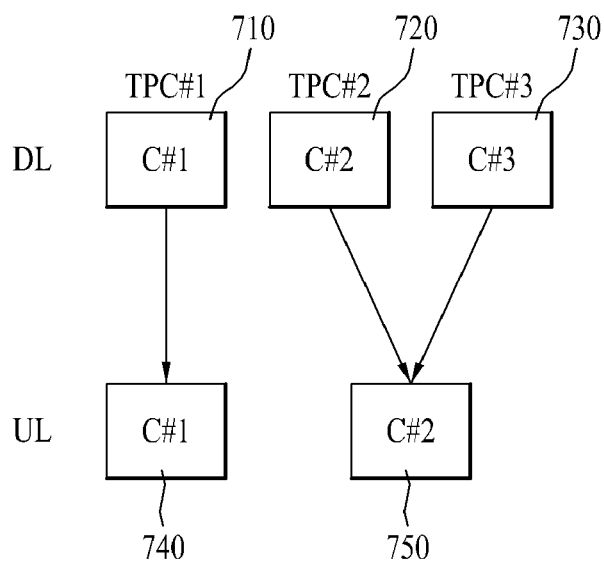
FIG. 7 illustrates an example in which a UE receives traffic from a plurality of downlink carriers and transmits an uplink signal through a plurality of uplink carriers.

FIG. 7 illustrates an example in which a UE receives traffic from a plurality of downlink carriers and transmits a signal through a plurality of uplink carriers.

As shown in FIG. 7, the UE may receive traffic through three downlink carriers 710, 720, and 730 and may transmit an uplink signal through two uplink carriers 740 and 750. The downlink carrier 710 is linked with the uplink carrier 740 and the downlink carriers 720 and 730 are linked with the uplink carrier 750. The mapping relationship between the downlink carriers and the uplink carriers is predefined and known by both the UE and the eNode B.

For example, when the eNode B transmits traffic requesting an ACK/NACK response through the three downlink carriers 710, 720, and 730 in the case in which the ratio between the number of downlink carriers and the number of uplink carriers is 3:2, the UE may transmit an ACK/NACK message using the two uplink carriers 740 and 750. Here, when the eNode B transmits a TPC command (or command value) in each of the three downlink carriers 710, 720, and 730, the UE needs to transmit 2 ACK/NACK messages in an uplink carrier (for example, the uplink carrier 750). Accordingly, in this case, the UE may transmit an ACK/NACK message for the traffic of each of the downlink carriers 720 and 730 through the uplink carrier 750. Here, the UE may determine uplink control channel transmission power based on the values of the TPC commands TPC#2 and TPC#3.

The TPC command values TPC#2 and TPC#3 that the eNode B transmits through PDCCHs of the downlink carriers 720 and 730 may be equal or different. The UE may apply the 2 TPC command values, which have been received from the eNode B through the downlink carriers 720 and 730, to transmission power of the uplink control channel using various methods. When the two received TPC command values are equal, the UE may determine transmission power of the uplink control channel, which is to be transmitted through the uplink carrier 750, based on the same TPC command value. However, when the 2 received TPC command values are different, the UE may determine transmission power of the uplink control channel based on one of the maximum, minimum, and average of the two TPC command values.

In addition, the UE may determine transmission power using only a TPC command value of a specific downlink carrier (for example, the downlink carrier 720) from among the two received TPC commands or may determine transmission power using a method in which TPC command values are used in a predetermined order and, when the UE has failed to receive a PDCCH of a desired downlink carrier, the UE determines transmission power based on a TPC command value in a next DL grant message in the predetermined order.

The links between the downlink carriers and the uplink carriers shown in FIG. 7 may be preconfigured in the higher layer. Only 2 TPC commands may be needed since the UE transmits uplink signals in the two uplink carriers 740 and 750. For example, in the case in which the eNode B transmits one TPC command in the downlink carrier 710 and transmits one TPC command in the downlink carrier 720, a resource region for the TPC command in the downlink carrier 730 may be used for other purposes or the TPC command message of the downlink carrier 720 may be repeatedly transmitted to the UE through the downlink carrier 730. The UE may receive and use one of the TPC command values from the downlink carriers 720 and 730 as a TPC command for the uplink carrier 750 to control uplink transmission power.

When the eNode B transmits one TPC command in the downlink carrier 720 and repeatedly transmits a TPC command message of the downlink carrier 720 in the downlink carrier 730, the probability of reception of a PDCCH in the downlink carrier 720 may be higher than the probability of reception of a PDCCH in the downlink carrier 710.

Alternatively, the eNode B may transmit the TPC command value TPC#1 of the downlink carrier 710 in the downlink carrier 730 and transmit the average, maximum, or minimum of the TPC command values TPC#1 and TPC#2 of the downlink carriers 710 and 720. In this case, when the UE has failed to receive a PDCCH for an uplink carrier, the UE may receive a TPC command value transmitted in the downlink carrier 730 to control uplink transmission power.

It is possible to consider a method in which a Reference Symbol (RS) (or pilot) is transmitted by boosting the level thereof by a certain level in a PUCCH resource structure. The boosting level of the RS may be expressed as a value in units of dB relative to PUCCH data power. In addition, when the UE transmits a plurality of PUCCH messages, it is also possible to employ a method in which the RS boosting levels of the plurality of PUCCH messages are set to be equal and a method in which the RS boosting levels of the plurality of PUCCH messages are set to predetermined levels or are weighted according to importance.

Although the above description has been given focusing upon a power correction message for a PUCCH which is transmitted from the eNode B to the UE, the present invention is not limited to the PUCCH. In addition, although the present invention has been described with reference to, as an example, an ACK/NACK message among control information that the UE transmits through the PUCCH, the present invention is not limited to the ACK/NACK message. The above method of the present invention may be extended to a method in which all uplink powers are controlled using a plurality of TPC command messages transmitted in a plurality of downlink carriers.

According to the present invention described above, it is possible to efficiently support an uplink power control operation of a UE in a system that supports multiple carriers.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

INDUSTRIAL APPLICABILITY

The user equipment and method for transmitting an uplink signal and the eNode B and method for transmitting uplink transmission power information in a mobile communication system that supports multiple carriers are industrially applicable to various communication systems such as 3GPP LTE, LTE-A, and IEEE 802 systems.

The invention claimed is:

1. A method of transmitting an uplink signal at a user equipment (UE) in a mobile communication system that supports multiple carriers, the method comprising:

receiving information regarding an uplink transmission power for a specific uplink carrier from an eNode B through a plurality of downlink carriers;

determining a transmission power of the uplink signal, which is to be transmitted in the specific uplink carrier, based on the information regarding the uplink transmission power; and transmitting the uplink signal through the specific uplink carrier based on the determined transmission power, wherein the information regarding to the uplink transmission power received through each of the plurality of downlink carriers includes an uplink Transmit Power Control (TPC) command for the user equipment, and wherein the transmission power of the uplink signal is determined based on a maximum value, a minimum value, or an average value of values indicated by TPC commands received through the plurality of downlink carriers.

2. The method according to claim 1, wherein the information regarding the uplink transmission power for the specific uplink carrier is received from each of the plurality of downlink carriers.

3. The method according to claim 1, wherein the information regarding the uplink transmission power is transmission power information of an uplink control channel.

4. The method according to claim 1, wherein the information regarding the uplink transmission power is received through each of a plurality of downlink control channels allocated respectively to the plurality of downlink carriers.

5. A user equipment (UE) for transmitting an uplink signal in a mobile communication system that supports multiple carriers, the user equipment comprising:

a receiver configured to receive information regarding an uplink transmission power for a specific uplink carrier from an eNode B through a plurality of downlink carriers;

a processor configured to determine a transmission power of the uplink signal, which is to be transmitted in the specific uplink carrier, based on the information regarding the uplink transmission power; and a transmitter configured to transmit the uplink signal through the specific uplink carrier based on the determined transmission power, wherein the information regarding to the uplink transmission power received through each of the plurality of downlink carriers includes an uplink Transmit Power Control (TPC) command for the user equipment, and wherein the processor is further configured to determine the transmission power of the uplink signal based on a maximum value, a minimum value, or an average value of values indicated by TPC commands received through the plurality of downlink carriers.

6. The user equipment according to claim 5, wherein the receiver is further configured to receive the information regarding the transmission power for the specific uplink carrier from each of the plurality of downlink carriers.

7. The user equipment according to claim 5, wherein the information regarding the uplink transmission power is transmission power information of an uplink control channel.

8. The user equipment according to claim 5, wherein the receiver is further configured to receive information regarding the uplink transmission power through each of a plurality of downlink control channels allocated respectively to the plurality of downlink carriers.

* * * * *